H. DEICHMAN.
DAMPER.
APPLICATION FILED JULY 17, 1915.
1,159,363.
Patented Nov. 9, 1915.
2 SHEETS—SHEET 1.
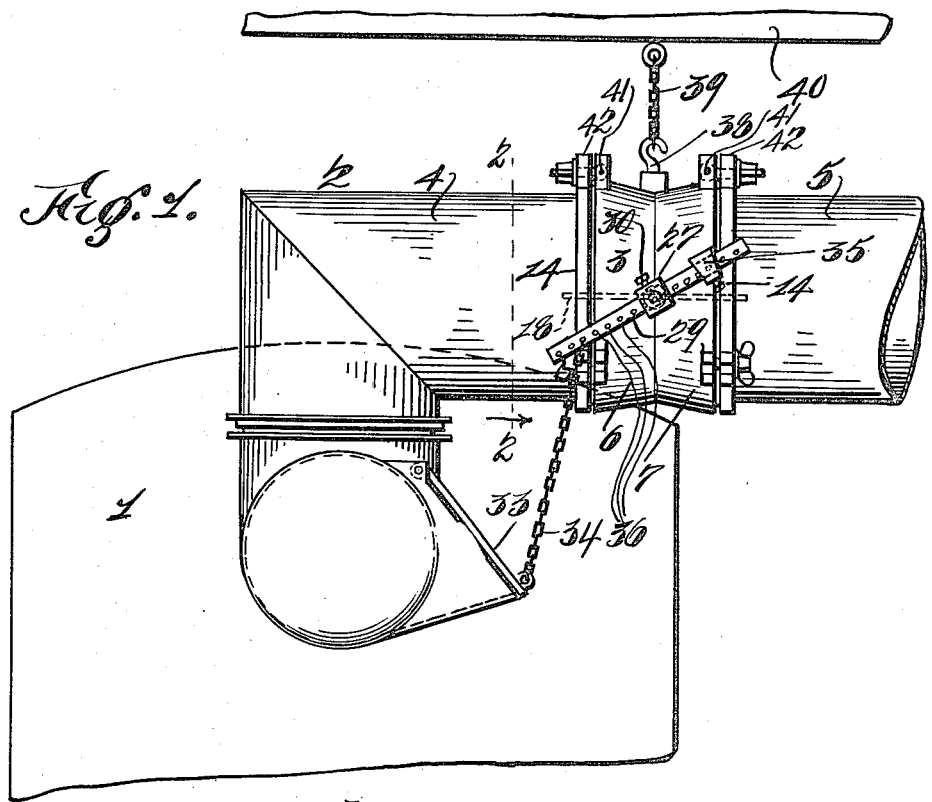
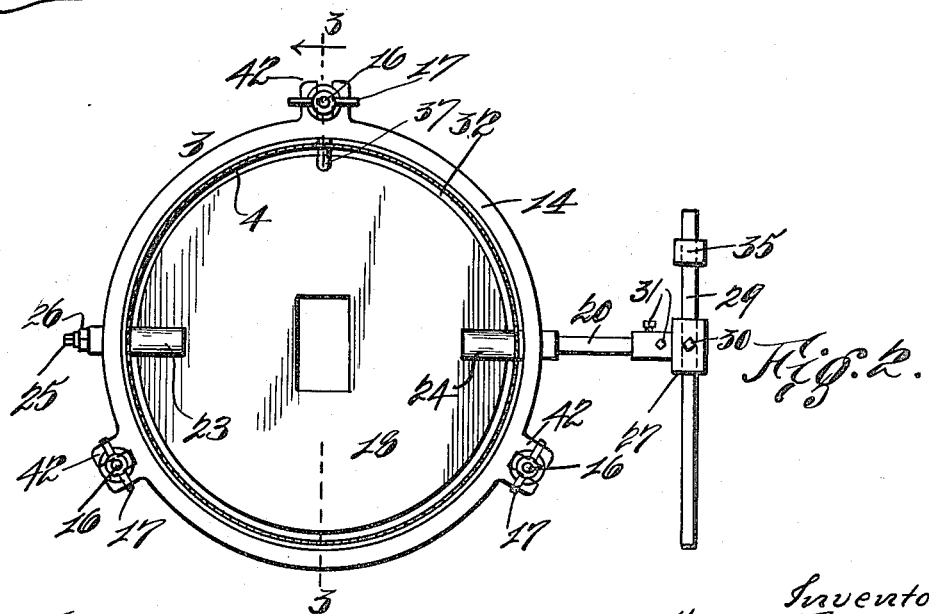
Inventor
Herman Deichman.
Witness
C. A. Jarvis
attorney.

H. DEICHMAN.
DAMPER.
APPLICATION FILED JULY 17, 1915.
1,159,363.
Patented Nov. 9, 1915.
2 SHEETS—SHEET 2.
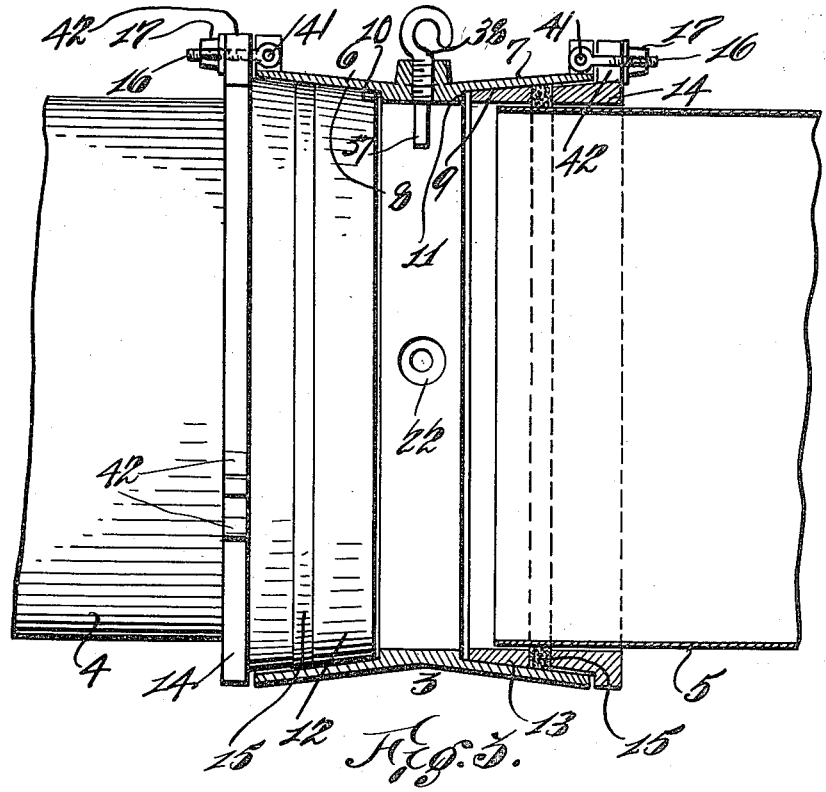
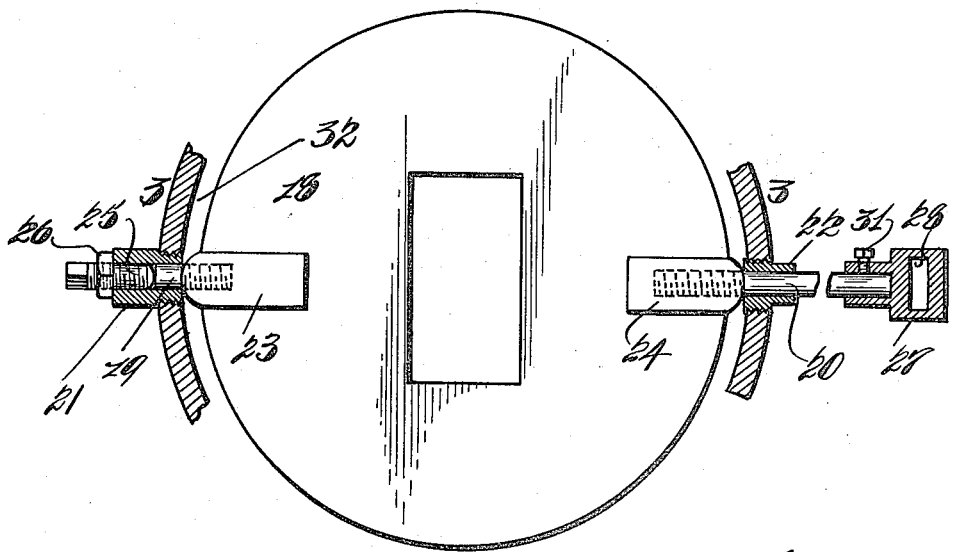
Witness
E. A. Jarvis
Inventor
Herman Deichman
by Maurice Bloch
attorney

UNITED STATES PATENT OFFICE.

HERMAN DEICHMAN, OF BROOKLYN, NEW YORK.

DAMPER.

1,159,363.                Specification of Letters Patent.        Patented Nov. 9, 1915.

Application filed July 17, 1915. Serial No. 40,362.

*To all whom it may concern:*

Be it known that I, HERMAN DEICHMAN, a subject of the Emperor of Germany, residing at Brooklyn, Kings county, in the State of New York, have invented certain new and useful Improvements in Dampers, of which the following is a full, clear, and exact description.

This invention relates to an improvement in damper mechanism for hot-water, steam or hot-air type of heaters, one of the objects of the invention being to provide a damper mechanism consisting of a check-draft door and smoke-pipe damper and means whereby both of said elements can be operated in unison, and also means whereby the extent of operation of the damper can be varied relatively to the operation of the check-draft door.

I will now proceed to describe my invention in detail, the essential features of which will be summarized in the appended claims, reference being had to the accompanying drawings, forming part hereof; wherein—

Figure 1 is a rear elevation of a portion of a heater and smoke-pipe having my improved damper mechanism attached thereto; Fig. 2 is an enlarged sectional view, taken on a line 2—2 in Fig. 1, the damper being illustrated as closed; Fig. 3 is an enlarged longitudinal sectional view partly in elevation, the section being taken on a line 3—3 in Fig. 2; and Fig. 4 is an enlarged sectional view, partly in elevation, of the damper and means for supporting same, a portion only of the damper casing being shown.

In Fig. 1 a portion of a heater is illustrated by 1, from which leads the smoke-pipe 2. A portion of my improvement comprises a casing 3 (see also Fig. 3) interposed in the smoke-pipe line. To interpose the damper-casing 3, I split the straight run of the smoke-pipe line into sections 4 and 5. The adjacent ends of the sections 4 and 5 are inserted into the casing 3, a special packing being provided to render the connection gas tight.

As can be seen in Fig. 3, the casing 3 is provided with conical ends 6 and 7 having tapering walls 8 and 9 terminating adjacent the center of the casing, shoulders 10 and 11 being provided. In the ends 6 and 7, I place movable packing rings 12 and 13 adapted to freely slide over the smoke-pipe sections 4 and 5. Each casing member, or section, carries a gland ring 14 between which and the packing rings, I place a packing substance 15, such as asbestos, mineral-wool or any substance that will withstand heat. When the glands 14 are forced inwardly, by the binding bolts 16 and nuts 17, the packing 15 will be spread to fill the space between the smoke-pipe and tapered wall of the casing; hence a gas tight connection will be produced.

Within the casing 3, I mount a damper 18 pivotally supported by trunnions 19 and 20, which are carried by bearing-blocks 21 and 22, which in turn are carried by the casing 3. The trunnions 19 and 20 are secured into blocks 23 and 24, respectively, carried by the damper 18. The trunnion 19 is in the form of a pin which is inserted in the bearing-block 21. To take up side lash, I provide the block 21 with an adjusting screw 25 having a lock-nut 26.

The trunnion 20 is in the form of a spindle which passes through the block 22, the outer end of the spindle carrying a block 27 having a slot 28 which carries an adjustable arm 29, a set-screw 30 being employed to firmly lock the arm 29 in the slot 28. The block 27 is adjustable upon the spindle 20, set-screws 31 being employed to lock the block to the spindle 20.

As can be seen in Fig. 2, the damper 18 is somewhat smaller than the smoke-pipe in order to provide a space or passage 32 between the damper and casing 3. The passage 32 provides an outlet for coal-gas when the damper 18 is closed to its full extent, as shown in Fig. 2.

The function of the arm 29 is to operate the damper 18, to open or close it, when the check-draft door 33 is operated, either manually or automatically.

As can be seen in Fig. 1, the check-draft door 33 is connected to the arm 29 by a chain 34. When the check-draft door is open the damper 18 will be closed, and when the check-draft door is closed, the damper 18 will be open.

To automatically close the damper 18 when the check-draft 33 opens, I provide the arm 29 with an adjustable weight 35. The weight 35 will be positioned upon the arm 29 so as to close the damper 18 when the door 33 is opened but to allow the weight of the check-draft door 33 to open the damper. In other words, the door 33 will overbalance the arm 29. To render the damper adjustable relative to the position of the check-draft door, I provide the arm 29 with a plurality of openings 36, any one of which may be engaged by the chain 34 or other flexible connection.

It will be quite evident that the damper 18 will close in the same proportion as the door 33 is opened. To prevent the damper from moving past the vertical or closed position, I provide a stop-pin or check 37 carried (in this instance) by a suspending hook 38. By this means, and a chain 39, or other suspension means, the smoke-pipe is suspended from any suitable support or floor timber 40.

For pipes of large diameter, say 14 inches or more, it will be found very convenient to support the damper-casing 3, as for pipes of such diameter the casing will be heavy. Furthermore by suspending or supporting the casing 3, I am able to disassemble the pipe-sections and casing without removing the casing. To disassemble the pipe-sections and casing, I loosen the wing-nuts 17, swing the bolts 16 outwardly, upon their pivots 41, to clear the nibs 42, after which I slide the gland-rings 14 along their pipe-sections to clear the casing-members or sections 6 and 7 whereupon the casing 3 can be moved to the right or left, swinging upon its suspension medium (in this instance the chain 39) to clear the pipe sections, one at a time, in order that the said sections can be removed. To assemble the pipes and casing, the above described operation would be reversed. These operations can be performed without removing the casing from its support. The extent of the movement of the damper 18 relative to the movement of the door 33 can be varied by placing the upper end of the chain 34 in any of the various openings 36 in the arm 29. The closer the upper end of the chain 34, is brought to the spindle 20, the more will be the movement of the damper relatively to the movement of the door 33. The door 33 may be manipulated manually or by the usual connections employed in combination with thermostats or other automatic devices for manipulating the draft controlling devices of heaters.

Having now described my invention, what I claim and desire to secure by Letters Patent is:

1. In combination with the smoke-pipe of a heater, a check-draft door, a damper in said pipe, an adjustable arm to operate said damper, said arm being provided with a plurality of openings, and means secured to the check-draft door arranged to engage any of the openings in said arm.

2. In combination with the smoke-pipe of a heater, a check-draft door, a damper in said pipe, an adjustable arm to operate said damper, said arm being provided with a plurality of openings, means secured to the check-draft door arranged to engage any of the openings in said arm, and a stop to prevent said damper from passing beyond its closed position.

3. In combination with the smoke-pipe of a heater, a check-draft door, a damper in said pipe, an adjustable arm to operate said damper, said arm being provided with a plurality of openings, means secured to the check-draft door arranged to engage any of the openings in said arm, and an adjustable weight carried by said arm.

4. A damper-casing consisting of conical members having tapering inner walls arranged to receive the adjacent ends of adjacent pipe sections, a packing element carried by each section arranged to render the connection between the pipes and casing gas-tight, a damper carried by said casing, said damper being of a diameter sufficient to provide a space between the edge thereof and the inner wall of said casing, and means to actuate said damper.

5. In combination with the smoke-pipe of a heater, a check-draft door, a damper in said pipe, a spindle therefor, a blank located at the outer end of said spindle provided with an opening, an arm slidably mounted in said opening, a set-screw to lock said arm in an adjusted position, an adjustable weight carried by said arm and located at one side of said block, and means connecting the opposite end of said arm to said check-draft door.

6. In combination with the smoke-pipe of a heater, a check-draft door, a damper in said pipe, a spindle therefor, a block located at the outer end of said spindle provided with an opening, an arm slidably mounted in said opening and provided with a plurality of openings, a set-screw to lock said arm in an adjusted position, an adjustable weight carried by said arm and loacted at one side of said block, and means connecting the opposite end of said arm to said check-draft door, said means being arranged to engage any of the openings in said arm.

7. In combination with the smoke-pipe of a heater, a check-draft door, a damper in said pipe, a spindle therefor, an arm carried by said spindle, and means directly connecting said check-draft door and damper-arm, said connecting means being permanently secured, at one end thereof, to said check-door and adjustably secured to said damper-arm at the other end thereof.

Signed at New York city, N. Y. this 16 day of July, 1915.

HERMAN DEICHMAN.

Witnesses:
EDWARD A. JARVIS,
MAURICE BLOCK.

Copies of this patent may be obtained for five cents each, by addressing the "Commissioner of Patents, Washington, D. C."